Patented Oct. 25, 1932

1,885,008

UNITED STATES PATENT OFFICE

SAMUEL ROSENBLATT, OF BRIGHTON, MASSACHUSETTS, ASSIGNOR TO SURGICAL DRESSINGS, INC., OF JAMAICA PLAIN, MASSACHUSETTS, A CORPORATION OF MASSACHUSETTS

PROCESS OF PRODUCING A WRAPPING, DRESSING, OR SIMILAR ARTICLE

No Drawing. Original application filed February 19, 1932, Serial No. 593,969. Divided and this application filed June 13, 1932. Serial No. 617,049.

This invention involves the method or process of producing a wrapping, dressing, or other similar article from relatively thin, pure, crude rubber to cause the article to possess highly retentively certain characteristics hereinafter set forth. By reason of these characteristics the article produced by the method or process of this invention is peculiarly adapted for a surgical wrapping or dressing and has a wide range of use in the medical profession, in the treatment of an animal body and particularly of the human body, which enables it to eliminate the disadvantages of surgical wrappings and bandages heretofore in use and for other purposes.

The method or process of this invention, however, produces an article which by reason of its characteristics has a wide range of use outside of the surgical field. It may be used in a wide variety of occupations to protect the fingers or other portions of the body against abrasion, cuts, or other injury to the skin. Thus, for example, it may be used protectively by workers in various arts, by sportsmen, athletes and others. It may be employed for the treatment of injuries to, or for the protection against injuries of, animals. It is highly sanitary and resistant to any of the substances to which rubber is resistant. In fact, it has a wide range of usefulness.

The object of the invention is, therefore, to produce an article having the prescribed characteristics hereinafter set forth and available for the uses hereinbefore set forth.

The nature and objects of the invention will appear more fully from the accompanying description and will be particularly pointed out in the claims.

The present application is a continuation in part of my pending application, Serial No. 509,670, filed January 19, 1931, and the invention is further disclosed in my pending application, Serial No. 593,969, filed February 19, 1932, of which the present is a division.

The process of this invention is employed in the treatment of a sheet or strip of pure crude rubber.

The basis of the article produced by this invention is a sheet or strip of pure crude rubber. By the term "crude" is meant that the rubber as it occurs in nature has not had added to or mixed with it any ingredients such as required for compounding or vulcanizing or for other purposes which would adulterate the rubber or tend to render it unfit for the uses described or where surgical or other morbid conditions prevail, and by "pure" is meant that the rubber has been produced as free from foreign matter as ordinary commercial conditions permit. A high quality of natural commercial coagulated latex in the crêped form which is well known on the market as "thin pale crêpe" is the best example at present known of the pure crude rubber which may be utilized in the practice of this process.

The sheet or strip of pure crude rubber is treated in accordance with the process of this invention to insure that it shall possess and retain to a high degree the following characteristics, first, non-adherence to hair or skin, second, great elastic extensibility, third, sufficient porosity to permit the passage of air therethrough, and, fourth, tenacious cohesion when pressed together. Preferably also as a still further feature of the invention, this pure crude rubber is treated to insure that it possess and retain to a high degree the characteristic of, fifth, sterility.

No other wrapping, dressing, or other article is known highly retentively to possess these characteristics. By "highly retentively" is meant that these essential characteristics shall be continued to be possessed by the article throughout any reasonable period required for commercially supplying it and its application and use. Tests have demonstrated that the required characteristics are retained for a period of two years, which is ample for this purpose.

The characteristic of non-adherence to hair or skin is self-explanatory. While pure crude rubber possesses this characteristic, the process of this invention retains it fully while developing the other desired characteristics. An article of this invention may be applied to and held under tension or pressure against the hair or skin of the body for an indefinite period without adhering thereto. This is of great importance as it enables the article to be applied and removed without the difficulty and pain which characterized the use of adhesive tapes and bandages generally employed and as it enables the article to be applied and removed without first removing hair from the afflicted part of the body. The article resulting from the process of this invention, unlike the old adhesive tapes and bandages, does not when removed tear or displace scar tissue which has formed, nor open a wound, nor otherwise act detrimentally to the healing period that has started.

The characteristic of great elastic extensibility is of great importance because it enables the article to be applied under an abnormal or desired degree of tension and consequently with the requisite pressure on the afflicted part of the body and because it enables it to be molded or fitted to the part of the body or to any application or device employed in connection therewith. By "great elastic extensibility" is meant that the article, as in the case of a wrapping or bandage, shall be capable of extension to at least three times its length and when its use is terminated, that it shall return approximately to its normal length. Thus any desired degree of tension and subsequently of pressure on the afflicted part or on the application is readily secured and retained throughout any required treatment period. In practice it is found that a wrapping or bandage produced by the process of this invention may be stretched to six times its length and still retain a high degree of elasticity during normal treatment periods. This characteristic enables the article not only to be employed as an ordinary surgical wrapping or bandage, but also to be employed as a tourniquet without danger of rupturing the skin and where a high degree of tension must be maintained in order so to constrict a member of the body as to prevent the flow of blood therethrough.

The characteristic of "sufficient porosity to permit the passage of air" through the wrapping or bandage is an important one. The pure crude rubber employed, especially in the preferable crêped form, possesses this characteristic to an appreciable degree and this characteristic is enhanced by the treatment given and still further by the extension of the article when applied in use. The article therefore affords the skin an opportunity to "breathe" and hence does not "draw" when applied, all of which is highly desirable in such an article. In fact, this article presents a wrapping or bandage having practically the same characteristics as a layer of human skin with its minute pores.

The characteristic of "tenacious cohesion when pressed together" is highly important. While the surfaces of freshly cut crude rubber cohere when pressed together, this characteristic, as the result of the process of this invention, is materially augmented with the result that the cohesion is a tenacious one and sufficient to hold the wrapping or bandage in position under the tension imposed by great extensibility and without the aid of any additional appliances. The end portions of the wrapping or bandage may be overlapped and pressed together, or the ends may be upturned and pressed together and then trimmed off flush, or in many cases the ends may be abutted and pressed together, in each case producing a sealed joint or seam and, in the latter cases particularly, a joint or seam without any material ridge. In its preferred form the condition is such that when the surfaces are pressed together and maintained at body temperature, a practically inseparable cohesion takes place. Thus the article is distinguished from the surgical wrappings and bandages in common use where additional appliances such as adhesive tape or other special securing and fastening devices are required. This also enables the bandage readily to be made into special unitary self-contained articles, such, for example, as finger cots.

The characteristic of sterility must essentially be somewhat relative. But the article produced by the process of this invention is so constructed and treated as to have a very high degree of sterility enabling it, if applied directly from the original package, to be used with the same degree of safety as packaged sterile bandages and dressings are now used.

The invention therefore presents a novel process for producing an article presenting the characteristics hereinbefore set forth.

The essential features of the process reside in properly correlating the temperature of the application of heat to the sheet or strip of crude rubber, the time period of the application of this heat, and the thickness or penetrability to heat of the rubber. With thin crêped rubber such as the ordinary "thin pale crêpe" of commerce in separated form, if the sheet or strip be subjected to hot air, it is found that the most satisfactory results are obtained at a temperature of 212° F. for a period of about thirty minutes, although satisfactory results have been obtained at this temperature for a period of about ten minutes. Quite satisfactory results are also obtained at a temperature as low as 150° F. if the period is at least thirty minutes. The heat may also be conducted directly to the rubber from a hot surface where the conditions are somewhat similar to the dry heat treatment. If the rubber be immersed in water, satisfactory results are obtained at a temperature as low as 150° F. for a period of thirty minutes and at higher temperatures the period may be reduced. If the water be maintained at the boiling point, a period as low as a minute or two produces satisfactory results, while prolonged boiling is not so satisfactory. The best results are secured if the rubber be subjected to steam at substantially 212° F. or under the conditions such as obtain in an ordinary surgeon's instrument sterilizing outfit. In this case the characteristics are developed in a very short period of time, good results being obtained in five minutes, but as the ordinary practice of sterilization requires the subjection of the article to be sterilized to about 212° F. in the presence of moisture for thirty minutes, it is desirable to maintain the rubber subject to the steam for that period and highly satisfactory results are developed under these conditions. This data will be sufficient to enable the desired treatment to be effected. When the desired qualities have been secured in the rubber, further prolonged treatment tends to destroy the desired qualities and if carried too far will result in ruining the product. When the rubber is treated in the roll form or in the package, a suitable increase in time must be allowed to enable the heat thoroughly to penetrate the mass.

This treatment of the sheet or strip of crude rubber by correlating the temperature of the applied heat, the period of time during which it is applied, and the thickness or character of the rubber effects what is known as a partial depolymerization of the rubber, or, in other words, controls the degree of depolymerization to retain the required characteristic of non-adherence to hair or skin, and to develop the required characteristics of great elastic extensibility, sufficient porosity to permit the passage of air therethrough, and tenacious cohesion when pressed together, as well as sterility when required, without developing the adhesive or sticky characteristics which further depolymerization would produce and which would render the rubber unfit for the desired use.

If a number of sheets or strips are treated together, soap may be employed to prevent the sheets from cohering and, when this is done, the sheets when removed from the bath of water or steam are placed in a second bath of clean water maintained at about the boiling point and in and by which the soap is removed. If it is desired further to treat or medicate the sheets or strips, they may be passed from the second bath to a third bath containing a liquid solution of the desired medicating ingredient, such, for example, as glycerin or eucalyptol. The use of glycerin has the further beneficial advantage that the wrapping or bandage may be used in a cold climate or its characteristics maintained where the temperature goes below freezing because the glycerin acts to maintain the article soft and pliable and enables it to be applied without preheating.

In order that the wrapping or bandage may be packaged, stored and furnished without premature self-coherence, it is desirable and usually necessary to provide the article in the form of a plurality of alternating layers of the rubber and of a suitable fabric. When the process of this invention is employed for producing an article such as a wrapping or a tourniquet under certain conditions, and where sterility is not important, the strip of pure crude rubber employed may be coated with talc or similar material to prevent cohesion, although the end portions of the strip should be left uncoated so as to enable the ends to be pressed together and to cohere when the strip is applied in use. Under ordinary circumstances, however, the interposed strips or layers of fabric are employed. This fabric may be of paper, cloth or other suitable material, but is preferably of the nature of a gauze fabric commonly employed for surgical dressings.

The wrapping or bandage is preferably furnished in roll form comprising a strip of the fabric and a strip of the rubber rolled up so that the fabric serves to prevent the layers of rubber from cohering, so that the fabric covers the entire roll, and so that the fabric itself may be separately used as a direct application or for other purposes. In the most desirable form the entire package or roll is rendered sterile. This enables the fabric to be used as an application applied directly to the wound, for example, and then the rubber strip to be applied thereover and secured by cohesion in place on the afflicted part.

When the article is furnished in roll form, the entire treatment may be conveniently effected after the roll has been placed and enclosed in a wrapping of paper or similar material within which it is to be marketed. The roll thus wrapped, for example, may be placed in the steam bath and maintained therein at the required temperature for the required time, as hereinbefore pointed out. This eliminates any handling or contamination of the roll of fabric and rubber during its final packaging and its subsequent distribution.

If further sterilization is required when the article is applied to its use, it may be effected in the same manner as surgeons' instruments and dressings are sterilized.

It is usually desirable that the article shall be as light in color as possible and bleaching may be effected by raising the temperature or prolonging the time of the heat treatment provided depolymerization is kept within the limits required to maintain the desired characteristics.

Having thus described the invention, what is claimed as new, and desired to be secured by Letters Patent, is:

1. The method of producing a wrapping, dressing, or other article described which consists in heating a sheet or strip of pure crude rubber and in correlating the temperature of the heat applied, the time period of the heat application, and the thickness or penetrability to heat of said sheet or strip to develop in said sheet or strip the characteristics of great elastic extensibility and tenacious cohesion when pressed together and to insure the highly retentive possession by said sheet or strip of the characteristics of non-adherence to hair or skin, great elastic extensibility and tenacious cohesion when pressed together.

2. The method of producing a wrapping, dressing, or other article described which consists in heating a sheet or strip of pure crude rubber and in correlating the temperature of the heat applied, the time period of the heat application, and the thickness or penetrability to heat of said sheet or strip to effect such a partial depolymerization of the rubber of said sheet or strip as to develop therein the characteristics of great elastic extensibility and tenacious cohesion when pressed together and as to insure the highly retentive possession thereby of the characteristics of non-adherence to hair or skin, great elastic extensibility and tenacious cohesion when pressed together.

3. The method of producing a wrapping, dressing, or other article described which consists in heating a sheet or strip of pure thin pale crêpe rubber in the presence of moisture at substantially 212° F. for about thirty minutes to develop in said sheet or strip the characteristics of great elastic extensibility and tenacious cohesion when pressed together, to enhance the porosity of said sheet or strip, to render the same sterile, and to insure the highly retentive possession by said sheet or strip of the characteristics of non-adherence to hair or skin, great elastic extensibility, tenacious cohesion when pressed together, and porosity.

4. The method of producing wrappings, dressings, or other articles described which consists in heating a plurality of sheets or strips of pure crude rubber in water containing soap in solution, in correlating the temperature of the heat applied, the time period of the heat application and the thickness or penetrability to heat of said sheets or strips to develop in said sheets or strips the characteristics of great elastic extensibility and tenacious cohesion when pressed together and to insure the highly retentive possession by said sheets or strips of the characteristics of non-adherence to hair or skin, great elastic extensibility, and tenacious cohesion when pressed together, and in thereafter washing the sheets or strips to remove the soap.

5. The method of producing wrappings, dressings, or other articles described as defined in claim 4, together with the additional step of immersing the washed sheets or strips in a liquid medicated bath.

6. The method of producing wrappings, dressings, or other articles described as defined in claim 4, together with the additional step of immersing the washed sheets or strips in a bath of water and glycerin to secure the retention at low temperatures of the developed characteristics.

7. The method of producing a wrapping, dressing, or other article described which consists in heating a sheet or strip of pure crude rubber and in correlating the temperature of the heat applied, the time period of the heat application, and the thickness or penetrability to heat of said sheet or strip to effect such a partial depolymerization of the rubber of said sheet or strip as to develop therein the characteristics of great elastic extensibility and tenacious cohesion when pressed together, to effect the bleaching of the rubber, and to insure the highly retentive possession by said sheet or strip of the characteristics of non-adherence to hair or skin, great elastic extensibility, and tenacious cohesion when pressed together.

8. The method of producing a wrapping, dressing, or other article described which consists in heating a sheet or strip of pure crude rubber and in correlating the temperature of the heat applied, the time period of the heat application, and the thickness or penetrability to heat of said sheet or strip to effect such a partial depolymerization of the rubber of said sheet or strip as to develop therein the characteristics of great elastic extensibility and tenacious cohesion when pressed together and as to insure the highly retentive possession thereby of the said characteristics and of the characteristic of non-adherence to hair or skin, and in increasing either or both the temperature of the heat applied and the time period of the heat application to effect the bleaching of the rubber and without further depolymerizing the rubber sufficiently to impair the foregoing developed characteristics.

In testimony whereof, I have signed my name to this specification.

SAMUEL ROSENBLATT.